US011570262B2

(12) United States Patent
Sapra et al.

(10) Patent No.: US 11,570,262 B2
(45) Date of Patent: Jan. 31, 2023

(54) METHODS, SYSTEMS, AND COMPUTER READABLE MEDIA FOR RANK PROCESSING FOR NETWORK FUNCTION SELECTION

(71) Applicant: Oracle International Corporation, Redwood Shores, CA (US)

(72) Inventors: Kawal Sapra, Bangalore (IN); Ankit Srivastava, Bangalore (IN); Venkatesh Aravamudhan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/082,871

(22) Filed: Oct. 28, 2020

(65) Prior Publication Data

US 2022/0131945 A1 Apr. 28, 2022

(51) Int. Cl.
*H04L 67/51* (2022.01)
*H04L 41/08* (2022.01)

(52) U.S. Cl.
CPC ............. *H04L 67/51* (2022.05); *H04L 41/08* (2013.01)

(58) Field of Classification Search
CPC .................. H04L 67/16; H04L 41/08
See application file for complete search history.

(56) References Cited

U.S. PATENT DOCUMENTS

| 5,381,413 A | 1/1995 | Tobagi et al. |
| 5,592,672 A | 1/1997 | Grewal et al. |
| 5,719,861 A | 2/1998 | Okanoue |
| 6,014,558 A * | 1/2000 | Thomas ................ H04W 12/06 |
| | | 455/410 |

(Continued)

FOREIGN PATENT DOCUMENTS

| CN | 1700694 A | 11/2005 |
| CN | 101151861 A | 3/2008 |

(Continued)

OTHER PUBLICATIONS

Hearing Notice for Indian Patent Application Serial No. 7526/CHENP/2012 (Feb. 10, 2021).

(Continued)

*Primary Examiner* — SM A Rahman
(74) *Attorney, Agent, or Firm* — Jenkins, Wilson, Taylor & Hunt, P.A.

(57) ABSTRACT

Methods, systems, and computer readable media for rank processing in network function selection. A method includes periodically receiving, at a network function discovery node, and from each producer network function of a number of producer network functions, a current load value specifying a computing load carried by the producer network function. The network function discovery node is configured for performing service discovery between network functions of a telecommunications core network. The method includes determining, for each producer network function, an available capacity for the producer network function based on the (Continued)

current load value and a published capacity of the producer network function. The method includes responding to a network function discovery request from a consumer network function using the available capacity of each producer network function.

18 Claims, 4 Drawing Sheets

(56) References Cited

U.S. PATENT DOCUMENTS

| | | | |
|---|---|---|---|
| 6,105,034 | A | 8/2000 | Buckler |
| 6,725,278 | B1 | 4/2004 | Gonzalez |
| 6,725,401 | B1 | 4/2004 | Lindhorst-Ko |
| 6,735,291 | B1 | 5/2004 | Schmid et al. |
| 6,748,435 | B1 | 6/2004 | Wang et al. |
| 7,151,945 | B2 | 12/2006 | Myles et al. |
| 7,308,499 | B2 | 12/2007 | Chavez |
| 7,631,093 | B2 | 12/2009 | Sternagle |
| 7,706,822 | B2 | 4/2010 | Emeott et al. |
| 7,742,421 | B2 | 6/2010 | Bantukul et al. |
| 7,782,776 | B2 | 8/2010 | Shankar et al. |
| 7,929,419 | B2 | 4/2011 | Sprague |
| 8,023,482 | B2 | 9/2011 | Gong et al. |
| 8,300,637 | B1 | 10/2012 | Bennett, III et al. |
| 8,306,034 | B2 | 11/2012 | Jang et al. |
| 8,498,202 | B2 | 7/2013 | Kanode et al. |
| 8,620,858 | B2 | 12/2013 | Backholm et al. |
| 8,645,565 | B2 | 2/2014 | Sparks et al. |
| 8,767,705 | B2 | 7/2014 | Göppner et al. |
| 8,811,228 | B2 | 8/2014 | Lopez et al. |
| 8,811,372 | B2 | 8/2014 | Li et al. |
| 8,824,449 | B2 | 9/2014 | van der Wateren et al. |
| 8,879,431 | B2 | 11/2014 | Ridel et al. |
| 8,954,080 | B2 | 2/2015 | Janakiraman et al. |
| 9,071,512 | B2 | 6/2015 | Marsico |
| 9,124,537 | B2 * | 9/2015 | Kolze ............... H04L 47/72 |
| 9,246,762 | B1 | 1/2016 | Watkins |
| 9,386,551 | B2 | 7/2016 | Zhou et al. |
| 9,667,590 | B2 | 5/2017 | Yan et al. |
| 10,097,504 | B2 | 10/2018 | Backholm |
| 10,285,155 | B1 | 5/2019 | Dodd-Noble et al. |
| 10,299,128 | B1 | 5/2019 | Suthar et al. |
| 10,313,362 | B2 * | 6/2019 | Ahuja ............ H04L 67/1029 |
| 10,361,843 | B1 | 7/2019 | Suthar et al. |
| 10,595,256 | B1 | 3/2020 | Marupaduga et al. |
| 10,609,154 | B2 | 3/2020 | Talebi Fard et al. |
| 10,609,530 | B1 | 3/2020 | Patil et al. |
| 10,616,934 | B2 | 4/2020 | Talebi Fard et al. |
| 10,637,753 | B1 | 4/2020 | Taft et al. |
| 10,652,098 | B2 | 5/2020 | Kim |
| 10,772,062 | B1 | 9/2020 | Albasheir et al. |
| 10,778,527 | B2 | 9/2020 | Assali et al. |
| 10,791,044 | B1 | 9/2020 | Krishan et al. |
| 10,819,636 | B1 | 10/2020 | Goel |
| 10,833,938 | B1 | 11/2020 | Rajput et al. |
| 10,880,370 | B2 | 12/2020 | Seenappa et al. |
| 11,018,971 | B2 | 5/2021 | Mahalank et al. |
| 11,082,393 | B2 | 8/2021 | Goel |
| 11,109,307 | B2 * | 8/2021 | Bartolomé ............ H04L 67/16 |
| 11,159,359 | B2 | 10/2021 | Goel |
| 11,224,009 | B2 | 1/2022 | Krishan |
| 11,271,846 | B2 | 3/2022 | Krishan |
| 11,290,549 | B2 | 3/2022 | Krishan |
| 2001/0039585 | A1 | 11/2001 | Primak et al. |
| 2003/0086410 | A1 | 5/2003 | Eikkula |
| 2003/0174649 | A1 | 9/2003 | Shankar et al. |
| 2003/0223414 | A1 | 12/2003 | Wong |
| 2004/0003069 | A1 | 1/2004 | Wong |
| 2004/0062278 | A1 | 4/2004 | Hadzic et al. |
| 2004/0088424 | A1 | 5/2004 | Park et al. |
| 2004/0114744 | A1 | 6/2004 | Trossen |
| 2004/0141473 | A1 | 7/2004 | Buot |
| 2004/0158606 | A1 | 8/2004 | Tsai |
| 2004/0205190 | A1 | 10/2004 | Chong et al. |
| 2004/0208183 | A1 | 10/2004 | Balachandran et al. |
| 2004/0221061 | A1 | 11/2004 | Chavez |
| 2005/0193096 | A1 | 9/2005 | Yu et al. |
| 2005/0207402 | A1 | 9/2005 | Kobayashi et al. |
| 2005/0227685 | A1 | 10/2005 | Costa Requena et al. |
| 2005/0232407 | A1 | 10/2005 | Craig et al. |
| 2006/0010224 | A1 | 1/2006 | Sekar et al. |
| 2006/0010321 | A1 | 1/2006 | Nakamura et al. |
| 2006/0069776 | A1 | 3/2006 | Shim et al. |
| 2006/0101143 | A1 | 5/2006 | Garcia et al. |
| 2006/0104210 | A1 | 5/2006 | Nielsen |
| 2006/0253563 | A1 | 11/2006 | Yang et al. |
| 2007/0050331 | A1 | 3/2007 | Bauman et al. |
| 2007/0156909 | A1 | 7/2007 | Osborn et al. |
| 2007/0191004 | A1 | 8/2007 | Yamakawa et al. |
| 2007/0237311 | A1 | 10/2007 | Ofir et al. |
| 2007/0242738 | A1 | 10/2007 | Park et al. |
| 2008/0165761 | A1 | 7/2008 | Goppner et al. |
| 2008/0280623 | A1 | 11/2008 | Danne et al. |
| 2009/0006652 | A1 | 1/2009 | Kasatani |
| 2009/0024727 | A1 | 1/2009 | Jeon et al. |
| 2009/0040923 | A1 | 2/2009 | Bantukul et al. |
| 2009/0055835 | A1 | 2/2009 | Zhu |
| 2009/0141625 | A1 | 6/2009 | Ghai et al. |
| 2009/0185494 | A1 | 7/2009 | Li et al. |
| 2009/0225584 | A1 | 9/2009 | Josefsberg et al. |
| 2009/0268723 | A1 | 10/2009 | Przybysz |
| 2010/0261490 | A1 | 10/2010 | Berry et al. |
| 2011/0078674 | A1 | 3/2011 | Ershov |
| 2011/0202604 | A1 | 8/2011 | Craig et al. |
| 2012/0079082 | A1 | 3/2012 | Ding et al. |
| 2013/0029708 | A1 | 1/2013 | Fox et al. |
| 2013/0039176 | A1 | 2/2013 | Kanode et al. |
| 2013/0198269 | A1 | 8/2013 | Fleischman et al. |
| 2013/0272123 | A1 | 10/2013 | Lee et al. |
| 2014/0040975 | A1 | 2/2014 | Raleigh et al. |
| 2014/0075004 | A1 | 3/2014 | Van Dusen et al. |
| 2014/0379901 | A1 | 12/2014 | Tseitlin et al. |
| 2015/0003296 | A1 | 1/2015 | Fan et al. |
| 2015/0016266 | A1 | 1/2015 | Dumitrescu et al. |
| 2015/0039560 | A1 | 2/2015 | Barker et al. |
| 2015/0071074 | A1 | 3/2015 | Zaidi et al. |
| 2015/0249588 | A1 | 9/2015 | Leon et al. |
| 2015/0263987 | A1 | 9/2015 | Klein et al. |
| 2015/0351084 | A1 | 12/2015 | Werb |
| 2016/0142324 | A1 | 5/2016 | Vihtari et al. |
| 2016/0149811 | A1 | 5/2016 | Roch et al. |
| 2016/0156513 | A1 | 6/2016 | Zhang et al. |
| 2016/0164788 | A1 | 6/2016 | Goel et al. |
| 2016/0183156 | A1 | 6/2016 | Chin et al. |
| 2016/0234119 | A1 | 8/2016 | Zaidi et al. |
| 2016/0315743 | A1 | 10/2016 | Nagaraj et al. |
| 2016/0344635 | A1 | 11/2016 | Lee et al. |
| 2016/0350683 | A1 * | 12/2016 | Bester ............... G06Q 10/0633 |
| 2016/0352588 | A1 | 12/2016 | Subbarayan et al. |
| 2016/0380906 | A1 | 12/2016 | Hodique et al. |
| 2017/0077751 | A1 * | 3/2017 | Forbes, Jr. ........ H02J 13/00034 |
| 2017/0187673 | A1 | 6/2017 | Kaliski, Jr. et al. |
| 2017/0220367 | A1 | 8/2017 | Li et al. |
| 2017/0221015 | A1 | 8/2017 | June et al. |
| 2017/0353387 | A1 | 12/2017 | Kwak et al. |
| 2018/0039494 | A1 | 2/2018 | Lander et al. |
| 2018/0083882 | A1 | 3/2018 | Krishan et al. |
| 2018/0159780 | A1 | 6/2018 | Essigmann et al. |
| 2018/0183724 | A1 | 6/2018 | Callard et al. |
| 2018/0213391 | A1 | 7/2018 | Inoue |
| 2018/0227243 | A1 | 8/2018 | Zhang et al. |
| 2018/0262592 | A1 | 9/2018 | Zandi et al. |
| 2018/0262625 | A1 | 9/2018 | McCarley et al. |
| 2018/0285794 | A1 | 10/2018 | Gray-Donald et al. |
| 2018/0324247 | A1 | 11/2018 | Hood et al. |
| 2018/0324646 | A1 | 11/2018 | Lee et al. |
| 2018/0343567 | A1 | 11/2018 | Ashrafi |
| 2019/0007366 | A1 | 1/2019 | Voegele et al. |
| 2019/0036871 | A1 | 1/2019 | Lapidous et al. |
| 2019/0045351 | A1 | 2/2019 | Zee et al. |
| 2019/0075552 | A1 | 3/2019 | Yu et al. |
| 2019/0116486 | A1 | 4/2019 | Kim et al. |

(56) References Cited

U.S. PATENT DOCUMENTS

| | | |
|---|---|---|
| 2019/0116521 A1 | 4/2019 | Qiao et al. |
| 2019/0140895 A1 | 5/2019 | Ennis, Jr. et al. |
| 2019/0158364 A1 | 5/2019 | Zhang et al. |
| 2019/0173740 A1 | 6/2019 | Zhang et al. |
| 2019/0174561 A1 | 6/2019 | Sivavakeesar |
| 2019/0182875 A1 | 6/2019 | Talebi Fard et al. |
| 2019/0191348 A1 | 6/2019 | Futaki et al. |
| 2019/0191467 A1 | 6/2019 | Dao et al. |
| 2019/0222633 A1 | 7/2019 | Howes et al. |
| 2019/0223093 A1 | 7/2019 | Watfa et al. |
| 2019/0230556 A1 | 7/2019 | Lee |
| 2019/0238642 A1 | 8/2019 | Sesham et al. |
| 2019/0261244 A1 | 8/2019 | Jung et al. |
| 2019/0268270 A1 | 8/2019 | Fattah |
| 2019/0306251 A1 | 10/2019 | Talebi Fard et al. |
| 2019/0306907 A1 | 10/2019 | Andreoli-Fang et al. |
| 2019/0313236 A1 | 10/2019 | Lee et al. |
| 2019/0313437 A1 | 10/2019 | Jung et al. |
| 2019/0313469 A1 | 10/2019 | Karampatsis et al. |
| 2019/0335002 A1 | 10/2019 | Bogineni et al. |
| 2019/0335534 A1 | 10/2019 | Atarius et al. |
| 2019/0342229 A1 | 11/2019 | Khinvasara et al. |
| 2019/0342921 A1 | 11/2019 | Loehr et al. |
| 2019/0349901 A1 | 11/2019 | Basu Mallick et al. |
| 2019/0357092 A1 | 11/2019 | Jung et al. |
| 2019/0380031 A1 | 12/2019 | Suthar et al. |
| 2019/0394284 A1 | 12/2019 | Baghel et al. |
| 2019/0394624 A1 | 12/2019 | Karampatsis et al. |
| 2019/0394833 A1 | 12/2019 | Talebi Fard et al. |
| 2020/0007632 A1 | 1/2020 | Landais et al. |
| 2020/0008069 A1 | 1/2020 | Zhu et al. |
| 2020/0028920 A1 | 1/2020 | Livanos et al. |
| 2020/0029197 A1 | 1/2020 | Tandon et al. |
| 2020/0045753 A1 | 2/2020 | Dao et al. |
| 2020/0045767 A1 | 2/2020 | Velev et al. |
| 2020/0053670 A1 | 2/2020 | Jung et al. |
| 2020/0053724 A1 | 2/2020 | MolavianJazi et al. |
| 2020/0053828 A1 | 2/2020 | Bharatia et al. |
| 2020/0059420 A1 | 2/2020 | Abraham |
| 2020/0059856 A1 | 2/2020 | Cui et al. |
| 2020/0076764 A1 | 3/2020 | Robitzsch et al. |
| 2020/0084663 A1 | 3/2020 | Park et al. |
| 2020/0092423 A1 | 3/2020 | Qiao et al. |
| 2020/0092424 A1 | 3/2020 | Qiao et al. |
| 2020/0106812 A1 | 4/2020 | Verma et al. |
| 2020/0127916 A1 | 4/2020 | Krishan |
| 2020/0136911 A1 | 4/2020 | Assali et al. |
| 2020/0137174 A1 | 4/2020 | Stammers et al. |
| 2020/0177629 A1 | 6/2020 | Hooda et al. |
| 2020/0192725 A1 | 6/2020 | Feldkamp |
| 2020/0305033 A1 | 9/2020 | Keller et al. |
| 2020/0313996 A1 | 10/2020 | Krishan et al. |
| 2020/0314615 A1 | 10/2020 | Patil et al. |
| 2020/0336554 A1* | 10/2020 | Deshpande ............. H04L 67/51 |
| 2020/0404608 A1 | 12/2020 | Albasheir et al. |
| 2020/0412597 A1 | 12/2020 | Goel et al. |
| 2021/0000723 A1 | 1/2021 | Strand et al. |
| 2021/0007023 A1 | 1/2021 | Umapathy et al. |
| 2021/0044481 A1 | 2/2021 | Xu et al. |
| 2021/0067480 A1 | 3/2021 | Goel |
| 2021/0067485 A1 | 3/2021 | Goel |
| 2021/0076248 A1* | 3/2021 | Kallam ................. G06F 9/3851 |
| 2021/0105214 A1 | 4/2021 | Goel |
| 2021/0111985 A1 | 4/2021 | Mahalank et al. |
| 2021/0168055 A1 | 6/2021 | Lair |
| 2021/0204200 A1 | 7/2021 | Krishan et al. |
| 2021/0235254 A1 | 7/2021 | Farooq |
| 2021/0273075 A1 | 9/2021 | Karasaridis et al. |
| 2021/0274392 A1 | 9/2021 | Dao et al. |
| 2021/0297935 A1 | 9/2021 | Belling et al. |
| 2021/0367916 A1 | 11/2021 | Belling et al. |
| 2022/0015023 A1 | 1/2022 | De-Gregorio-Rodriguez et al. |
| 2022/0022024 A1 | 1/2022 | Aravind |
| 2022/0038545 A1 | 2/2022 | Krishan |
| 2022/0070648 A1 | 3/2022 | Krishan |

FOREIGN PATENT DOCUMENTS

| | | |
|---|---|---|
| CN | 101366311 A | 2/2009 |
| CN | 101512971 A | 8/2009 |
| CN | ZL 200780036907.1 | 2/2012 |
| CN | 105635345 B | 2/2019 |
| CN | 109788078 A | 5/2019 |
| EP | 0 950 952 A2 | 10/1999 |
| EP | 1 175 074 A2 | 1/2002 |
| EP | 2 575 303 A1 | 4/2013 |
| IN | 333811 | 3/2020 |
| JP | 2006-279805 A | 10/2006 |
| KR | 10-2004-0057858 A | 7/2004 |
| KR | 10-2005-0002335 A | 1/2005 |
| KR | 10-2006-0025869 A | 3/2006 |
| WO | WO 00/69140 | 11/2000 |
| WO | WO 01/13228 A2 | 2/2001 |
| WO | WO 2008/019056 A2 | 2/2008 |
| WO | WO 2008/144927 A1 | 12/2008 |
| WO | WO 2009/018418 A2 | 2/2009 |
| WO | WO 2011/100629 A2 | 8/2011 |
| WO | WO 2017/143915 A1 | 8/2017 |
| WO | WO 2018/174021 A1 | 9/2018 |
| WO | WO 2018/174516 A1 | 9/2018 |
| WO | WO 2019/144321 A1 | 1/2019 |
| WO | WO 2019/034609 A1 | 2/2019 |
| WO | WO 2019/062596 A1 | 4/2019 |
| WO | WO 2019/076273 A1 | 4/2019 |
| WO | WO 2019/144321 A1 | 8/2019 |
| WO | WO 2019/215308 A1 | 11/2019 |
| WO | WO 2019/220172 A1 | 11/2019 |
| WO | WO 2020/091934 A1 | 5/2020 |
| WO | WO 2020/263486 A1 | 12/2020 |
| WO | WO 2021/040827 A1 | 3/2021 |
| WO | WO 2021/055998 A1 | 3/2021 |
| WO | WO 2021/138074 A1 | 7/2021 |
| WO | WO 2022/025987 A1 | 2/2022 |
| WO | WO 2022/050987 A1 | 3/2022 |

OTHER PUBLICATIONS

Notification of Transmittal of the International Search Report and the Written Opinion of the International Searching Authority, or the Declaration for International Application No. PCT/US2021/033031 (dated May 18, 2021).

Non-Final Office Action for U.S. Appl. No. 16/945,794 (dated Sep. 15, 2021).

Commonly-assigned, co-pending U.S. Appl. No. 17/468,076 for "Methods, Systems, and Computer Readable Media for Using Service Communications Proxy (SCP) or Security Edge Protection Proxy (SEPP) to Apply or Override Preferred-Locality Attribute During Network Function (NF) Discovery" (Unpublished, filed Sep. 7, 2021).

Commonly-assigned, co-pending U.S. Appl. No. 17/397,968 for "Methods, Systems, and Computer Readable Media for Processing Network Function (NF) Discovery Requests at NF Repository Function (NRF) Using Prioritized Lists of Preferred Locations," (Unpublished, filed Aug. 9, 2021).

Notification of Transmittal of the International Search Report and the Written Opinion of the International Searching Authority, or the Declaration for International Application No. PCT/US2021/024000 (dated Jun. 24, 2021).

Non-Final Office Action for U.S. Appl. No. 16/356,446 (dated Jun. 16, 2021).

Commonly-assigned, co-pending U.S. Appl. No. 17/337,356 for "Methods, Systems, and Computer Readable Media for Applying or Overriding Preferred Locality Criteria in Processing Network Function (NF) Discovery Requests," (Unpublished, filed Jun. 2, 2021).

Notification of Transmittal of the International Search Report and the Written Opinion of the International Searching Authority, or the Declaration for U.S. Patent Application Serial No. PCT/US2021/020120 (dated Jun. 1, 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

(56) References Cited

OTHER PUBLICATIONS

"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).

"3rd Generation Partnership Project; Technical Specification Group Services and System Aspects; Security architecture and procedures for 5G system (Release 17)," 3GPP TS 33.501, V17.1.0, pp. 1-256 (Mar. 2021).

"3rd Generation Partnership Project; Technical Specification Group Core Network and Terminals; 5G System; Public Land Mobile Network (PLMN) Interconnection; Stage 3 (Release 17)," 3GPP TS 29.573, V17.0.0, pp. 1-100 (Mar. 2021).

"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).

Commonly-assigned, co-pending U.S. Appl. No. 17/203,693 for "Methods, Systems, and Computer Readable Media for Hypertext Transfer Protocol (HTTP) Stream Tuning for Load and Overload Control," (Unpublished, filed Mar. 16, 2021).

Commonly-assigned, co-pending U.S. Appl. No. 17/200,777 for "Methods, Systems, and Computer Readable Media for Supporting Multiple Preferred Localities for Network Function (NF) Discovery and Selection Procedures" (Unpublished, filed Mar. 13, 2021).

Nokia et al., "Discussion paper on authorization for Model D Indirect communications", 3GPP TSG SA WG3; S3-194380 (Nov. 11, 2019).

Commonly-assigned, co-pending U.S. Appl. No. 17/543,989 for "Methods, Systems, and Computer Readable Media for Dynamic Adjustment to Network Function Profile for Discovery Responses" (Unpublished, filed Dec. 17, 2021).

Notice of Allowance and Fee(s) Due for U.S. Appl. No. 17/074,553 (dated Dec. 29, 2021).

Notice of Allowance and Fee(s) Due for U.S. Appl. No. 17/001,599 (dated Nov. 17, 2021).

Notice of Allowance and Fee(s) Due for U.S. Appl. No. 17/102,404 (dated Oct. 7, 2021).

Notification of Transmittal of the International Search Report and the Written Opinion of the International Searching Authority, or the Declaration for International Application No. PCT/US2021/033031 (dated Sep. 16, 2021).

"3rd Generation Partnership Project; Technical Specification Group Services and System Aspects; Security architecture and procedures for 5G system (Release 17)," 3GPP TS 33.501, V17.3.0, pp. 1-258 (Sep. 2021).

"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

"3rd Generation Partnership Project; Technical Specification Group Services and System Aspects; System architecture for the 5G System (5GS); Stage 2 (Release 17)," 3GPP TS 23.501, V17.2.0, pp. 1-542 (Sep. 2021).

"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).

Non-Final Office Action for U.S. Appl. No. 17/074,553 (dated Aug. 18, 2021).

Notice of Allowance and Fee(s) Due for U.S. Appl. No. 16/730,799 (dated Aug. 16, 2021).

Commonly-assigned, co-pending U.S. Appl. No. 17/392,288 for "Methods, Systems, and Computer Readable Media for Optimized Routing of Service Based Interface (SBI) Request Messages to Remote Network Function (NF) Repository Functions Using Indirect Communications Via Service Communications Proxy (SCP)" (Unpublished, filed Aug. 3, 2021).

Notice of Allowance and Fee(s) Due for U.S. Appl. No. 16/730,799 (dated Jul. 30, 2021).

Notice of Allowance and Fee(s) Due for U.S. Appl. No. 16/601,380 (dated Jan. 19, 2021).

Non-Final Office Action for U.S. Appl. No. 16/601,380 (dated Sep. 15, 2020).

Notice of Allowance and Fee(s) Due for U.S. Appl. No. 16/176,920 (dated Apr. 16, 2020).

Applicant-Initiated Interview Summary for U.S. Appl. No. 16/176,920 (dated Apr. 1, 2020).

Non-Final Office Action for U.S. Appl. No. 16/176,920 (dated Mar. 6, 2020).

Notification of Transmittal of the International Search Report and the Written Opinion of the International Searching Authority, or the Declaration for International Application Serial No. PCT/US2019/053912 (dated Dec. 18, 2019).

Commonly-assigned, co-pending U.S. Appl. No. 16/601,380 for "Methods, Systems, and Computer Readable Media for Distributing Network Function (NF) Topology Information Among Proxy Nodes and for Using the NF Topology Information for Inter-Proxy Node Message Routing," (Unpublished, filed Oct. 14.

Commonly-assigned, co-pending International Application No. PCT/US19/53912 for "Methods, Systems, and Computer Readable Media for Providing a Service Proxy Function in a Telecommunications Network Core Using a Service-Based Architecture." (Unpublished filed Sep. 30 2019).

Commonly-assigned, co-pending U.S. Appl. No. 16/176,920 for "Methods, Systems, and Computer Readable Media for Providing a Service Proxy Function in a Telecommunications Network Core Using a Service-Based Architecture," (Unpublished filed Oct. 31, 2018).

"3rd Generation Partnership Project; Technical Specification Group Core Network and Terminals; 5G System; Network Function Repository Services; Stage 3 (Release 16)," 3GPP TS 29.510, V16.0.0, pp. 1-135 (Jun. 2019).

"3rd Generation Partnership Project; Technical Specification Group Services and System Aspects; Study on Enhancements to the Service-Based Architecture (Release 16)," 3GPP TR 23.742, V0.3.0, pp. 1-64 (Jul. 2018).

"3rd Generation Partnership Project; Technical Specification Group Services and System Aspects; Study on Enhancements to the Service-Based Architecture (Release 16)," 3GPP TR 23.742, V0.2.0, pp. 1-39 (Jun. 2018).

"5G; Procedures for the 5G System (3GPP TS 23.502 version 15.2.0 Release 15)," ETSI TS 123 502 V15.2.0, pp. 1-46 (Jun. 2018).

Scholl et al., "An API First Approach to Microservices Development," Oracle, https://blogs.oracle.com/developers/an-api-first-approach-to-microservices-development, pp. 1-12 (Nov. 8, 2017).

"Pseudo-CR on Service Discovery and Registration using NRF service," Ericsson, 3GPP TSG CT4 Meeting #79, 3GPP TR 29.891-v0.3.0, pp. 1-4 (Aug. 21-25, 2017).

Hearing Notice for Indian Application No. 1106/CHENP/2009 (May 28, 2015).

Notice of Allowance and Fee(s) Due for U.S. Appl. No. 13/197,566 (dated Feb. 20, 2015).

Notification of the Second Office Action for Chinese Application No. 201180013381.1 (dated Feb. 10, 2015).

Notification of Reexamination for Chinese Application No. 200880109633.9 (dated Jan. 29, 2015).

Extended European Search Report for European Patent Application No. 08796925.9 (dated Nov. 21, 2014).

Non-Final Office Action for U.S. Appl. No. 13/197,566 (dated Aug. 27, 2014).

Notification of Reexamination for Chinese Patent Application No. 200880109633.9 (dated Jul. 28, 2014).

Notification of the First Office Action for Chinese Application No. 201180013381.1 (dated Jun. 5, 2014).

First Examination Report for Indian Patent Application No. 1106/CHENP/2009 (dated Jan. 28, 2014).

Extended European Search Report for European Application No. 07836478.3 (dated Nov. 18, 2013).

Notice of Allowance and Fee(s) Due for U.S. Appl. No. 13/026,153 (dated Apr. 15, 2013).

(56) References Cited

OTHER PUBLICATIONS

Communication of European Publication Number and Information on the Application of Article 67(3) EPC for European Patent Application No. 11742923.3 (dated Nov. 21, 2012).
First Office Action for Chinese Patent Application No. 200820109633.9 (dated May 3, 2012).
Notification of Transmittal of the International Search Report and the Written Opinion of the International Searching Authority, or the Declaration for International Application No. PCT/US2011/024645 (dated Oct. 28, 2011).
Notice of Allowance for U.S. Appl. No. 11/510,284 (dated Dec. 9, 2010).
Chinese Office Action for Chinese Patent Application No. 200780036907.1 (dated Oct. 11, 2010).
Final Official Action for U.S. Appl. No. 11/510,284 (Jun. 22, 2010).
Official Action for U.S. Appl. No. 11/510,284 (dated Feb. 23, 2010).
Notice of Allowance and Fee(s) Due for U.S. Appl. No. 12/183,406 (dated Feb. 12, 2010).
3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
Tsou et al., "Realm-Based Redirection in Diameter," Internet Engineering Task Force, draft-ietf-dime-realm-based-redirect-02, pp. 1-7 (Oct. 27, 2009).
Final Official Action for U.S. Appl. No. 11/510,284 (dated Jul. 9, 2009).
Notification of Transmittal of the International Search Report and the Written Opinion of the International Searching Authority, or the Declaration for International Application No. PCT/US2008/071718 (dated Jan. 28, 2009).
Official Action for U.S. Appl. No. 11/510,284 (dated Dec. 24, 2008).
Notification of Transmittal of the International Search Report and the Written Opinion of the International Searching Authority, or the Declaration for International Application No. PCT/US07/17329 (dated Feb. 15, 2008).
A. B. Roach, "Session Initiation Protocol (SIP)-Specific Event Notification," dynamicsoft, Network Working Group, pp. 1-38 (Jun. 2002).
Rosenberg, "SIP Proxies," www.dynamicsoft.com, pp. 1-30 (Jul. 2000).
Wiesmann et al., "Understanding Replication in Databases and Distributed Systems," IEEE, pp. 464-474 (Apr. 10, 2000).
Wang et al., "A Signaling System Using Lightweight Call Sessions," IEEE, pp. 697-706 (Mar. 26, 2000).
Gribble et al., "The MultiSpace: an Evolutionary Platform for Infrastructural Services," The University of California at Berkeley, pp. 157-170 (Jun. 6, 1999).
Handley et al., "SIP: Session Initiation Protocol," IETF RFC 2543, pp. 1-153 (Mar. 1999).
Handley et al., "SDP: Session Description Protocol," IETF RFC 2327, pp. 1-42 (Apr. 1998).
S. Paul et al., "Reliable Multicast Transport Protocol (RMTP)," IEEE Journal on Selected Areas in Communications, vol. 15, No. 3, pp. 407-421 (Apr. 1997).
Lin et al., "A Reliable Multicast Transport Protocol," IEEE Infocom, pp. 1414-1424 (1996).
Notification of Transmittal of the International Search Report and the Written Opinion of the International Searching Authority, or the Declaration for International Application Serial No. PCT/US2020/065765 (dated Apr. 15, 2021).
Ex Parte Quayle Action for U.S. Appl. No. 16/730,799 (Apr. 7, 2021).
Notice of Allowance and Fee(s) Due for U.S. Appl. No. 16/555,817 (dated Mar. 24, 2021).
International Search Report and Written Opinion for Patent Cooperation Treaty Application Serial No. PCT/US2020/061885 (dated Feb. 4, 2021).

International Search Report and Written Opinion for Patent Cooperation Treaty Application Serial No. PCT/US2020/057712 (dated Feb. 2, 2021).
Cheshire, S. et al., "Apple's DNS Long-Lived Queries protocol draft-sekar-dns-llq-06," Internet Engineering Task Force (IETF), pp. 1-26 (Aug. 23, 2019).
Final Office Action for U.S. Appl. No. 16/697,021 (dated Feb. 2, 2021).
Applicant-Initiated Interview Summary for U.S. Appl. No. 16/697,021 (dated Jan. 26, 2021).
"3rd Generation Partnership Project; Technical Specification Group Services and System Aspects; Procedures for the 5G System (5GS); Stage 2 (Release 16)," 3GPP TS 23.502, V16.7.0, pp. 1-603 (Dec. 2020).
"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).
"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).
"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).
Advisory Action for U.S. Appl. No. 16/356,446 (dated Dec. 22, 2020).
Notice of Allowance and Fee(s) Due for U.S. Appl. No. 16/555,817 (dated Dec. 3, 2020).
Commonly-assigned, co-pending Continuation-in-Part U.S. Appl. No. 17/102,404 for "Methods, Systems, and Computer Readable Media for Policing Access Point Name-Aggregate Maximum Bit Rate (APN-AMBR) Across Packet Data Network Gateway Data Plane (P-GW DP) Worker Instances," (Unpublished, filed Nov. 23, 2020).
Commonly-assigned, co-pending U.S. Appl. No. 17/156,149 for "Methods, Systems, and Computer Readable Media for Optimized Routing of Messages Relating to Existing Network Function (NF) Subscriptions Using an Intermediate Forwarding NF Repository Function (NRF)," (Unpublished, filed Nov. 9, 2020).
Commonly-assigned, co-pending Continuation-in-Part U.S. Appl. No. 17/074,553 for "Methods, Systems, and Computer Readable Media for Actively Discovering and Tracking Addresses Associated with 4G Service Endpoints," (Unpublished, filed Oct. 19, 2020).
"P-GW Administration Guide, StarOS Release 21.20," Cisco, pp. 1-1164 (Oct. 11, 2020).
"3rd Generation Partnership Project; Technical Specification Group Core Network and Terminals; Non-Access-Stratum (NAS) protocol for Evolved Packet System (EPS); Stage 3 (Release 17)," 3GPP TS 24.301, V17.0.0, pp. 1-585 (Sep. 2020).
3rd Generation Partnership Project; Technical Specification Group Services and System Aspects; Architecture enhancements to facilitate communications with packet data networks and applications (Release 16), 3GPP TS 23.682, V16.8.0, pp. 1-135 (Sep. 2020).
Non-Final Office Action for U.S. Appl. No. 16/697,021 (dated Sep. 29, 2020).
Commonly-assigned, co-pending continuation in part U.S. Appl. No. 17/102,404 for "Methods, Systems, and Computer Readable Media for Policing Access Point Name-Aggregate Maximum Bit Rate (APN-AMBR) Across Packet Data Network Gateway Data Plane (P-GW DP) Worker Instances," (Unpublished, filed Sep. 23, 2020).
Notice of Allowance and Fee(s) Due for U.S. Appl. No. 16/527,988 (dated Sep. 17, 2020).
Final Office Action for U.S. Appl. No. 16/356,446 (dated Sep. 8, 2020).
Notice of Allowance and Fee(s) Due and Examiner-Initiated Interview Summary for U.S. Appl. No. 16/453,955 (dated Aug. 26, 2020).
Commonly-assigned, co-pending U.S. Appl. No. 17/001,599 for "Methods, Systems, and Computer Readable Media for Optimized Network Function (NF) Discovery and Routing Using Service

(56) References Cited

OTHER PUBLICATIONS

Communications Proxy (SCP) And NF Repository Function (NRF)," (Unpublished, filed Aug. 24, 2020).
Notification of the Transmittal of the International Search Report and the Written Opinion of the International Searching Authority, or the Declaration for International Application No. PCT/US2020/034723 (dated Aug. 17, 2020).
Non-Final Office Action for U.S. Appl. No. 16/555,817 (dated Aug. 7, 2020).
"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).
Commonly-assigned, co-pending U.S. Appl. No. 16/945,794 for "Methods, Systems, And Computer Readable Media For Preferred Network Function (NF) Location Routing Using Service Communications Proxy (SCP)," (Unpublished, filed Jul. 31, 2020).
Notification of Transmittal of the International Search Report and the Written Opinion of the International Searching Authority, or the Declaration for International Application Serial No. PCT/US2020/035004 (Jul. 7, 2020).
"3rd Generation Partnership Project; Technical Specification Group Core Network and Terminals; 5G System; Network Function Repository Services; Stage 3 (Release 16)," 3GPP TS 29.510 V16.4.0, pp. 1-206 (Jul. 2020).
Ex Parte Quayle Action for U.S. Appl. No. 16/527,988 (Jun. 1, 2020).
"3rd Generation Partnership Project; Technical Specification Group Core Network and Terminals; 5G System; Technical Realization of Service Based Architecture; Stage 3 (Release 16)," 3GPP TS 29.500 V16.4.0 pp. 1-79 (Jun. 2020).
Notice of Allowance and Fee(s) Due for U.S. Appl. No. 16/369,691 (dated May 12, 2020).
Non-Final Office Action for U.S. Appl. No. 16/356,446 (dated May 11, 2020).
"3rd Generation Partnership Project; Technical Specification Group Services and System Aspects; Procedures for the 5G System (5GS); Stage 2 (Release 16)," 3GPP TS 23.502 V16.4.0, pp. 1-582 (Mar. 2020).
"3rd Generation Partnership Project; Technical Specification Group Services and System Aspects; System architecture for the 5G System (5GS); Stage 2 (Release 16)," 3GPP TS 23.501 V16.4.0, pp. 1-430 (Mar. 2020).
Commonly-assigned, co-pending U.S. Appl. No. 16/697,021 for "Methods, Systems, and Computer Readable Media for Diameter-Peer-Wide Egress Rate Limiting at Diameter Relay Agent (DRA)," (Unpublished, filed Nov. 27, 2019).
"5G; System architecture for the 5G System (5GS) (3GPP TS 23.501 version 15.6.0 Release 15)," ETSI TS 123 501, V15.6.0, pp. 1-168 (Oct. 2019).
"5G; 5G System; Network function repository services; Stage 3 (3GPP TS 29.510 version 15.5.1 Release 15)," ETSI TS 129 510, V15.5.1, pp. 1-132 (Oct. 2019).
"3rd Generation Partnership Project; Technical Specification Group Core Network and Terminals; 5G Systems; Network Function Repository Services; Stage 3 (Release 16)," 3GPP TS 29.510 V.16.1.1, pp. 1-150 (Oct. 2019).
"3rd Generation Partnership Project; Technical Specification Group Core Network and Terminals; 5G System; Technical Realization of Service Based Architecture; Stage 3 (Release 16)," 3GPP TS 29.500 V16.1.0, pp. 1-43 (Sep. 2019).
"3rd Generation Partnership Project; Technical Specification Group Service and System Aspects; System Architecture for the 5G System (5GS); Stage 2 (Release 16)," 3GPP TS 23.501 V16.2.0, pp. 1-391 (Sep. 2019).
"3rd Generation Partnership Project; Technical Specification Group Services and System Aspects; Architecture enhancements to facilitate communications with packet data networks and applications (Release 16)," 3GPP TS 23.682, V16.4.0, pp. 1-30 (Sep. 2019).
"5G; 5G System; Technical Realization of Service Based Architecture; Stage 3 (3GPP TS 29.500 version 15.5.0 Release 15)," ETSI TS 129 500, V15.5.0, pp. 1-40 (Sep. 2019).
Cheshire et al., "Apple's DNS Long-Lived Queries protocol," Network Working Group, Apple, Inc., pp. 1-26 (Aug. 22, 2019).
"Diameter and Diameter Applications," Alcatel-Lucent, http://infodoc.alcatel-lucent.com/html/0_add-h-f/93-0098-HTML/7750_SR_OS_Triple_Play_Guide/GX-PolicyMgmt.html, pp. 1-40 (Aug. 22, 2019).
Commonly-assigned, co-pending U.S. Appl. No. 16/527,988 for "Methods, Systems, and Computer Readable Media for Network Function (NF) Topology Synchronization," (Unpublished, filed Jul. 31, 2019).
"3rd Generation Partnership Project; Technical Specification Group Radio Access Network; NG-RAN; NG Application Protocol (NGAP) (Release 15)," 3GPP TS 38.413, V15.4.0, pp. 1-328 (Jul. 2019).
"3rd Generation Partnership Project; Technical Specification Group Core Network and Terminals; 5G System; Network Function Repository Services; Stage 3 (Release 15)," 3GPP TS 29.510, V15.4.0, pp. 1-127 (Jun. 2019).
"3rd Generation Partnership Project; Technical Specification Group Core Network and Terminals; 5G System; Restoration Procedures (Release 16)," 3GPP TS 23.527, V16.0.0, pp. 1-19 (Jun. 2019).
"3rd Generation Partnership Project; Technical Specification Group Core Network and Terminals; Numbering, addressing and identification (Release 15)," 3GPP TS 23.003, V15.7.0, pp. 1-131 (Jun. 2019).
"Class of Service Feature Guide (Routers and EX9200 Switches)," Junos® OS, Juniper Networks, pp. 1-1530 (Apr. 10, 2019).
"3rd Generation Partnership Project; Technical Specification Group Services and System Aspects; System Architecture and 5G; Stage 2 (Release 16)," 3GPP TS 23.501, V16.0.0, pp. 1-318 (Mar. 2019).
Penttinen, "5G Explained: Security and Deployment of Advanced Mobile Communications," Chapter 6, Section 6.3.8 NRF, 2 pages (Feb. 2019).
"Oracle Communications Diameter Signaling Router," Release Notice, Release 8.3, E93179 Revision 02, Oracle, pp. 1-98 (Dec. 2018).
"3rd Generation Partnership Project; Technical Specification Group Network and Terminals; 5G Systems; Network Function Repository Services; Stage 3 (Release 15)," 3GPP TS 29.510, V15.2.0, pp. 1-113 (Dec. 2018).
"3rd Generation Partnership Project; Technical Specification Group Network and Terminals; 5G Systems; Principles and Guidelines for Services Definition; Stage 3 (Release 15)," 3GPP TS 29.501, V15.2.0, pp. 1-66 (Dec. 2018).
"3rd Generation Partnership Project; Technical Specification Group Services and System Aspects; Study on Enhancements to the Service-Based Architecture (Release 16)," 3GPP TR 23.742, V16.0.0, pp. 1-131 (Dec. 2018).
"Addressing 5G Network Function Requirements," Intel® FPGAs and Intel PAC 5G QoS and IPSec Benchmarking, White Paper, pp. 1-8 (Oct. 2018).
"5G; 5G System; Network function repository services; Stage 3 (3GPP TS 29.510 version 15.1.0 Release 15)," ETSI TS 129 510, V15.1.0, pp. 1-87 (Oct. 2018).
"5G; 5G System; Unified Data Repository Services; Stage 3 (3GPP TS 29.504 version 15.1.0 Release 15)," ETSI TS 129 504, V15.1.0, pp. 1-26 (Oct. 2018).
"CPS vDRA Configuration Guide," Release 18.3.0 (Restricted Release)(1), Cisco, pp. 1-130 (Sep. 14, 2018).
"How To Do Rate Limiting of Diameter Messages Using NetScaler," Citrix Systems Inc., pp. 1-3 (Sep. 4, 2018).
"5G; 5G System; Technical Realization of Service Based Architecture; Stage 3 (3GPP TS 29.500 version 15.0.0 Release 15)," ETSI TS 129 500, V15.0.0, pp. 1-29 (Jul. 2018).
"Cisco Ultra 5G Packet Core Solution," Cisco, White paper, https://www.cisco.com/c/dam/en/us/products/collateral/routers/network-convergence-system-500-series-routers/white-paper-c11-740360.pdf, pp. 1-11 (2018).
Li et al., "Mobile Edge Computing Platform Deployment in 4G LTE Networks: A Middlebox Approach," https://www.usenix.org/system/files/conference/hotedge18/hotedge18-papers-li.pdf, 6 pages (2018).
Mayer, "RESTful APIs for the 5G Service Based Architecture," Journal of ICT, vol. 6_1&2, pp. 101-116 (2018).

(56) References Cited

OTHER PUBLICATIONS

"5G Service Based Architecture (SBA)," 5G, pp. 1-61 (downloaded Dec. 24, 2018).
Brown et al., "Service-Based Architecture for 5G Core Networks," Huawei, Heavy Reading, https://www.3g4g.co.uk/5G/5Gtech_6004_2017_11_Service-Based-Architecture-for-5G-Core-Networks_HR_Huawei.pdf, pp. 1-12 (Nov. 2017).
"3rd Generation Partnership Project; Technical Specification Group Services and System Aspects; System Architecture for the 5G System; Stage 2 (Release 15)," 3GPP TS 23.501, V1.5.0, pp. 1-170 (Nov. 2017).
Carlton et al., "HTTP and DNS in a 5G World," https://www.computerworld.com/article/3204594/http-and-dns-in-a-5g-world.html, pp. 1-5 (Jun. 30, 2017).
Benacer et al., "A High-Speed Traffic Manager Architecture for Flow-Based Networking," pp. 1-4 (2017).
"Dynamically Reconfigurable Optical-Wireless Backhaul/Fronthaul with Cognitive Control Plane for Small Cells and Cloud-RANs: D3.1 Analysis of state of the art on scalable control plane design and techniques for user mobility awareness. Definition of 5G-XHaul control plane requirements," European Commission, 5G-XHaul, pp. 1-107 (Jun. 31, 2016).
"3rd Generation Partnership Project; Technical Specification Group Core Network and Terminals; Domain Name System Procedures; Stage 3 (Release 13)," 3GPP TS 29.303 V13.4.0, pp. 1-69 (Jun. 2016).
"Multi-Layer Security Protection for Signaling Networks," Oracle Communications, Oracle white paper, pp. 1-9 (Jan. 2016).
Kantola et al., "Policy-based communications for 5G mobile with customer edge switching," Security and Communication Networks, vol. 9, pp. 3070-3082 (2016).
Fielding et al. "Hypertext Transfer Protocol (HTTP/1.1): Semantics and Content", Internet Engineering Taskforce (IETF) Request for Comments: 7231, IEFT RFC 7231, pp. 1-102 (Jun. 2014).
Abley et al., "A Mechanism for Remote-Triggered DNS Cache Flushes (DNS Flush)," Network Working Group, Google, pp. 1-12 (Jun. 24, 2013).
Preston-Werner, "Semantic Versioning 2.0.0", Oracle, pp. 1-5 (Jun. 2013).
"LTE and Beyond," https://ytd2525.wordpress.com/2013/03/06/lte-and-beyond/, 3 pages (2013).
Fajardo et al., "Diameter Based Protocol," Internet Engineering Task Force (IETF) Request for Comments: 6733, pp. 1-152 (Oct. 2012).
Gulbrandsen et al., "A DNS RR for specifying the location of services (DNS SRV)," RFC 2782, pp. 1-12 (Feb. 2000).
Nichols et al., "Definition of the Differentiated Services Field (DS Field) in the IPv4 and IPv6 Headers," Internet Engineering Task Force (IEFT) Netwok Working Group Request for Comments (RFC) 2474, The Internet Society, pp. 1-20 (Dec. 1998).
Final Office Action for U.S. Appl. No. 16/945,794 (dated Feb. 8, 2022).
Commonly-assigned, co-pending U.S. Appl. No. 17/356,461 for "Methods, Systems and Computer Readable Media for Optimizing Network Traffic Distribution using Timeslot-Based Tracked Producer Network Function (NF) Performance During Producer NF Selection" (Unpublished, filed Jun. 23, 2021).
Commonly-assigned, co-pending U.S. Appl. No. 17/485,284 for "Methods, Systems and Computer Readable Media For Providing Priority Resolver for Resolving Priorities and Network Function (NF) Instances" (Unpublished, filed Sep. 24, 2021).
Notice of Allowance and Fee(s) Due for U.S. Appl. No. 16/356,446 (dated Sep. 30, 2021).
Commonly-assigned, co-pending U.S. Appl. No. 17/487,142 for "Methods, Systems, and Computer Readable Media for Network Function Discovery Using Preferred-Locality Information" (Unpublished, filed Sep. 28, 2021).
"3rd Generation Partnership Project; Technical Specification Group Core Network and Terminals; Numbering, addressing and identification; (Release 17)," 3GPP TS 23.003, V17.1.0, pp. 1-143 (Mar. 2021).
"3rd Generation Partnership Project; Technical Specification Group Core Network and Terminals; 5G System; Session Management Services; Stage 3 (Release 17)," 3GPP 29.502, V17.1.0, pp. 1-299 (Jun. 2021).
"3rd Generation Partnership Project; Technical Specification Group Core Network and Terminals; 5G System; Principles and Guidelines for Services Definition; Stage 3 (Release 17)," 3GPP TS 29.501, V17.2.0, pp. 1-78 (Jun. 2021).
"3rd Generation Partnership Project; Technical Specification Group Services and System Aspects; Procedures for the 5G System (5GS); Stage 2 (Release 17)," 3GPP TS 23.502, V17.0.0, pp. 1-646.
Vixie et al., "Dynamic Updates in the Domain Name System (DNS Update)," Network Working Group, RFC 2136, pp. 1-26 (Apr. 1997).
Notice of Allowance for U.S. Appl. No. 17/156,149 (dated Apr. 19, 2022).
Communication of European Publication Number and Information on the Applicatoin of Article 67(3) EPC for European Patent Application Serial No. 20732441.9 (dated Apr. 6, 2022).
Non-Final Office Action for Chinese Patent Application Serial No. 201980067968.7 (dated Mar. 3, 2022).
First Examination Report for Indian Patent Application Serial No. 202147011137 (dated Mar. 9, 2022).
Commonly-assigned, co-pending U.S. Appl. No. 17/497,879 for "Methods, Systems, and Computer Readable Media for Routing Inter-Public Land Mobile Network (Inter-PLMN) Messages Related to Existing Subscriptions with Network Function (NF) Repository Function (NRF) Using Security Edge Protection Proxy (SEPP)" (Unpublished, filed Oct. 21, 2021).
Commonly-assigned, co-pending U.S. Appl. No. 17/356,451 for "Methods, Systems, and Computer Readable Media for Resolution of Inter-Network Domain Names" (Unpublished, filed Jun. 23, 2021).
Notice of Allowance and Fee(s) Due for U.S. Appl. No. 16/697,021 (dated Jun. 21, 2021).
Notice of Publication for International Application Serial No. PCT/US2020/061885 (dated Jun. 3, 2021).
Notice of Allowance and Fee(s) Due for U.S. Appl. No. 17/001,599 (dated May 17, 2021).
Advisory Action for U.S. Appl. No. 16/697,021 (dated May 7, 2021).
Applicant-Initiated Interview Summary for U.S. Appl. No. 17/001,599 (dated May 5, 2021).
Commonly-assigned, co-pending U.S. Appl. No. 17/009,725 for "Methods, Systems, and Computer Readable Media for Service Communications Proxy (SCP)-Specific Prioritized Network Function (NF) Discovery and Routing," (Unpublished, filed Sep. 1, 2020).
Huawei, "eSBA: reselection of producer instance," 3GPP TSG-SA2 Meeting #132, pp. 1-2 (Apr. 12, 2019).
Docomo, "Update Solution 4 for implicit registration," SA WG2 Meeting #129, pp. 1-2 (Oct. 15-19, 2018).
"Implementing Quality of Service Policies with DSCP," Cisco, pp. 1-7 (Feb. 15, 2008).
Communication of European publication number and information on the application of Article 67(3) EPC for European Patent Application Serial No. 19791391.6 (dated Aug. 11, 2021).
Decision for Refusal for Indian Patent Application Serial No. 7526/CHENP/2012 (dated Jul. 22, 2021).

\* cited by examiner

METHODS, SYSTEMS, AND COMPUTER READABLE MEDIA FOR RANK PROCESSING FOR NETWORK FUNCTION SELECTION

TECHNICAL FIELD

The subject matter described herein relates to methods and systems for selecting network functions in a telecommunications network. More particularly, the subject matter described herein relates to methods, systems, and computer readable media for rank processing for network function selection.

BACKGROUND

The $3^{rd}$ Generation Partnership Project (3GPP) is a collaboration between groups of telecommunications standards associations. The 3GPP defined mobile phone system specifications for telecommunications networks including 3G, 4G, and Long Term Evolution (LTE) networks.

The next generation network for 3GPP is the 5G network. The 5G specifications target high data rates, reduced latency, energy saving, cost reduction, higher system capacity, and increasing numbers of connected devices.

The 3GPP has defined a service-based architecture for its next generation 5G core network. In a service-based architecture, services are provided to software components by application components, typically through a communication protocol over a data communications network. A service can be, e.g., a discrete function that can be accessed remotely and consumed and updated independently of other services in the system.

Different services can be used together to provide the functionality of a larger functional system such as a software application. The service-based architecture can integrate distributed and separately-maintained software components.

Accordingly, there exists a need for methods, systems, and computer readable media for rank processing for network function selection.

SUMMARY

Methods, systems, and computer readable media for rank processing in network function selection. An example system includes at least one processor and memory storing instructions for the at least one processor. The system includes a network function discovery node implemented on the at least one processor.

The network function discovery node is configured for performing service discovery between network functions of a telecommunications core network. The network function discovery node is configured for periodically receiving, from each producer network function of a number of producer network functions, a current load value specifying a computing load carried by the producer network function.

The network function discovery node is configured for determining, for each producer network function, an available capacity for the producer network function based on the current load value and a published capacity of the producer network function. The network function discovery node is configured for responding to a network function discovery request from a consumer network function using the available capacity of each producer network function.

In some examples, the network function discovery node is configured for determining, for each producer network function, a current priority for the producer network function based on the available capacity of the produced network function. In some examples, the network function discovery node is configured for determining, for each instance of a plurality of network function instances, an instance available capacity, sorting the network function instances by instance available capacity, and assigning a current priority to each instance based on a sorted position of the instance.

In some examples, the network function discovery node is configured for determining, for each instance of a plurality of network function instances, an instance available capacity, determining a mean capacity of the instance available capacities, and categorizing each instance as a high priority instance if the instance available capacity is greater than the mean capacity and as a low priority instance if the instance available capacity is less than or equal to the mean capacity.

In some examples, the network function discovery node is configured for determining, for each producer network function, whether the current load for the producer network function exceeds a permissible load threshold and, if the current load exceeds the permissible load threshold, removing the producer network function from consideration in responding to at least one network function discovery request. In some examples, the network function discovery node is configured for reconsidering a removed producer network function in response to determining that the current load for the removed producer network function has dropped below an abatement load threshold.

In some examples, the network function discovery node is configured for registering each of the producer network functions and, during registration, receiving the published capacity of the producer network function and a published priority for the producer network function. In some examples, the network function discovery node is configured for registering each of the producer network functions and, during registration, receiving a load reporting interval specifying a rate of load reporting for the producer network function.

In some examples, the network function discovery node is a network function (NF) repository function (NRF) or a service communications proxy (SCP). In some examples, the network function discovery node is configured for determining available capacity of the producer network functions at a service level of the telecommunications network core network.

An example method for rank processing in network function selection includes periodically receiving, at a network function discovery node implemented on at least one processor, and from each producer network function of a plurality of producer network functions, a current load value specifying a computing load carried by the producer network function. The network function discovery node is configured for performing service discovery between a plurality of network functions of a telecommunications core network.

The method includes determining, at the network function discovery node, and for each producer network function, an available capacity for the producer network function based on the current load value and a published capacity of the producer network function. The method includes responding, at the network function discovery node, to a network function discovery request from a consumer network function using the available capacity of each producer network function.

In some examples, the method includes determining, for each producer network function, a current priority for the producer network function based on the available capacity of the produced network function. In some examples, the method includes determining, for each instance of a plurality of network function instances, an instance available capacity, sorting the network function instances by instance available capacity, and assigning a current priority to each instance based on a sorted position of the instance.

In some examples, the method includes determining, for each instance of a plurality of network function instances, an instance available capacity, determining a mean capacity of the instance available capacities, and categorizing each instance as a high priority instance if the instance available capacity is greater than the mean capacity and as a low priority instance if the instance available capacity is less than or equal to the mean capacity. In some examples, the method includes determining, for each producer network function, whether the current load for the producer network function exceeds a permissible load threshold and, if the current load exceeds the permissible load threshold, removing the producer network function from consideration in responding to at least one network function discovery request.

In some examples, the method includes reconsidering a removed producer network function in response to determining that the current load for the removed producer network function has dropped below an abatement load threshold. In some examples, the method includes registering each of the producer network functions and, during registration, receiving the published capacity of the producer network function and a published priority for the producer network function.

In some examples, the method includes registering each of the producer network functions and, during registration, receiving a load reporting interval specifying a rate of load reporting for the producer network function. In some examples, the network function discovery node is a network function (NF) repository function (NRF) or a service communications proxy (SCP). In some examples, the method includes determining available capacity of the producer network functions at a service level of the telecommunications network core network.

In some examples, a non-transitory computer readable medium having stored thereon executable instructions that when executed by a processor of a computer controls the computer to perform steps comprising: periodically receiving, at a network function discovery node implemented on at least one processor, and from each producer network function of a plurality of producer network functions, a current load value specifying a computing load carried by the producer network function, wherein the network function discovery node is configured for performing service discovery between a plurality of network functions of a telecommunications core network; determining, at the network function discovery node, and for each producer network function, an available capacity for the producer network function based on the current load value and a published capacity of the producer network function; and responding, at the network function discovery node, to a network function discovery request from a consumer network function using the available capacity of each producer network function.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps.

Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
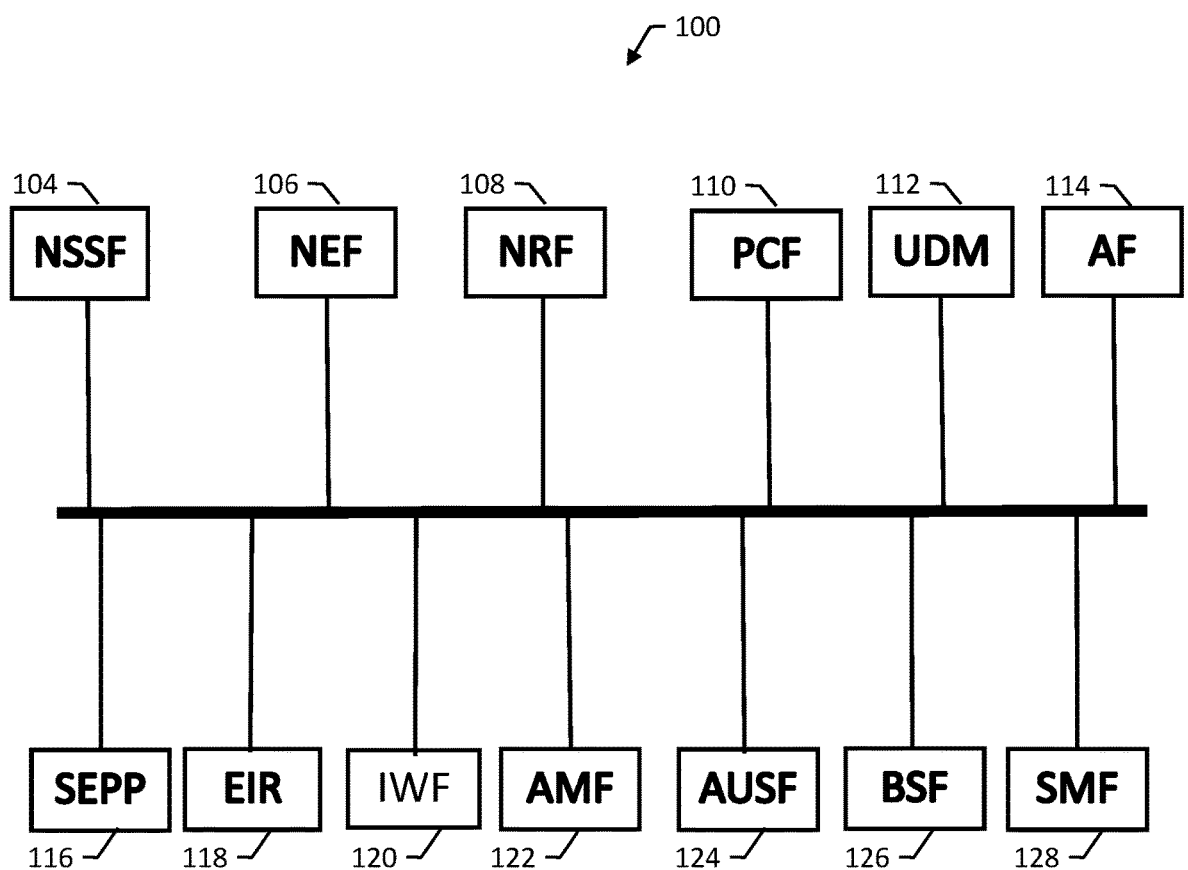
FIG. 1 is a block diagram illustrating an example telecommunications network core that uses a service-based architecture.

Methods, systems, and computer readable media for rank processing in network function selection in a telecommunications network core. In particular, the disclosed subject matter includes a network function discovery node configured for performing service discovery between network functions of a telecommunications network core.

The 3GPP 5G specifications specify the way that components in the telecommunication network core communicate with each other. The core network in 5G follows a service-based architecture where network elements advertise and provide services which can be consumed using, for example, REST APIs by other network elements in the telecommunications network core. This allows for the adoption of web scale technologies and software in telecommunications networks.

In the 5G architecture, the focus is on loosely coupled services as opposed to tightly coupled functions and point-to-point interfaces. HTTP/2, for example, is used as a service-based application layer protocol. The 5G architecture supports native control and user plane separation. The 5G architecture supports the unified data management framework, an expanded and unified policy framework, and an expanded network exposure functionality.

The network functions in the telecommunication network core can be considered as producer network functions and consumer network functions. Producer network functions provide services for consumer network functions that consume the services. Some network functions will act as consumer network functions at sometimes and as producer network functions at other times.

The 3GPP specifications provide multiple parameters to select preferable producer network functions. From the perspective of a producer network function:

A network function (NF) repository function (NRF) provides consumer network functions with information on priority, load, and capacity of producer network functions during a network function discovery procedure Priority and capacity information are usually provided during a registration procedure; however, the information may not be updated Load information is dynamic in nature Consumer network functions may select producer network functions based on priority as reported by the NRF. The network function priority information, however, can be static information. Static information may be less useful than dynamic information in selecting an appropriate producer function.

The systems described in this specification can be configured for calculating available capacity and, in turn, providing dynamic priority information.

In some examples, producer network functions report their capacity and priority during registration. Producer network functions may optionally choose to update their capacity and priority after registration.

Then, producer network functions periodically report load information to the NRF. The NRF can use the load information in conjunction with the capacity and priority information stored during a network function discovery procedure.

The NRF can use a rank processing algorithm to calculate:
available capacity by using capacity and load
priority dynamically based on available capacity The NRF updates the discovery response based on available capacity and dynamically calculated priority. The procedure complies with the discovery query procedure as specified by the 3GPP specifications.

The rank processing algorithm enables the NRF to prioritize network functions based on their available capacity. In some examples, the NRF allows the following configurations:
Permissible load threshold: A network function instance is considered heavily loaded when a current load exceeds this threshold.
Abatement load threshold: A threshold for current load that, when the current load falls below the threshold, the network function instance is no longer considered heavily loaded The NRF can be configured to remove any producer network function with a current load above the permissible load threshold from network function discovery responses. The NRF can then consider any removed producer network functions when their current load goes below the abatement load threshold.

In some examples, the NRF processes the discovery procedure output and assigns an available capacity based on the current load of the producer network function as follows:

$$C_A = P_C - (P_L * P_C)$$

where,
$C_A$=available capacity of a network function instance;
$P_C$=published capacity of the network function instance; and
$P_L$=published load of the network function instance (in %).

In some examples, the NRF categorizes producer network function instances on the basis of available capacity as follows:
Calculate arithmetic mean of available capacities
Arithmetic mean=$\Sigma\ C_A$ of network function instances/number of network function instances
Categorize the producer network functions into:
High priority—available capacity greater than arithmetic mean
Low priority—available capacity greater than arithmetic mean The NRF can then sort the list of producer network functions based on the available capacity ($C_A$) and assign priority according to positions in the list. The rank processing algorithm can be applied at both the network function and the network function service level.

The systems described in this specification can provide one or more of the following benefits.
Offload consumer network functions from performing load-based producer network function instance selection
Reduce resource utilization at the consumer network function
Potential latency reduction in the network
Improve or optimize load balancing across producer network functions in the telecommunications network core
Avoid selection of highly loaded producer network functions, which can improve one or more of:
Response delay
Message success rate
Round trip latency
KPIs and SLAs
Flexibility to be applied in different network deployments:
PLMN level
Slice level
Shared-slice level
The rank processing algorithm can be used at the service communications proxy (SCP) or other appropriate network function discovery nodes.

FIG. 1 is a block diagram illustrating an example telecommunications network core 100 that uses a service-based architecture. Telecommunications network core 100 can be, e.g., a 3GPP 5G telecommunications network core. As shown in FIG. 1, telecommunications network core 100 includes network functions communicating with each other.

The networks functions illustrated in FIG. 1 are merely examples of network functions in telecommunications network core 100. Other types of appropriate network functions can be included, and in some examples, telecommunications network core 100 will include fewer network functions.

As shown in FIG. 1, telecommunications network core 100 includes a network slice selection function (NSSF) 104, a network exposure function (NEF) 106, a network function repository function (NRF) 108, a policy control function (PCF) 110, a unified data management (UDM) function 112, an application function (AF) 114, a security edge protection proxy (SEPP) 116, an EIR 118, an interworking function (IWF) 120, an access and mobility management function (AMF) 122, an authentication server function (AUSF), a bootstrapping server function (BSF) 126, and a session management function (SMF) 128.

Some of the network functions shown in FIG. 1 are used for 5G-4G interworking. For example, NSSF 104, NEF 106, NRF 108, SEPP 116, EIR 118, IWF 120, and BSF 126 can be used to facilitate 5G-4G interworking.

NRF 108 can be a key component of the 5G Service Based Architecture. NRF 108 maintains an updated repository of all the 5G elements available in the operator's network along with the services provided by each of the elements in the 5G core that are expected to be instantiated, scaled and terminated without or minimal manual intervention. In addition to serving as a repository of the services, NRF 108 also supports discovery mechanisms that allows 5G elements to discover each other and get updated status of the desired elements.

In some examples, NRF 108 supports the following functions:

Maintains the profiles of the available NF instances and their supported services in the 5G core network Allows consumer NF instances to discover other providers NF instances in the 5G core network Allows NF instances to track the status of other NF instances The NRF interacts with every other element in the 5G core network and it supports the above functions through the following services:

Management Services

Discovery Services

NRF 108 can be deployed in a cloud computing environment along side of the network functions to provide various services to facilitate a service-based architecture, e.g., routing control, resiliency, and observability to telecommunications network core 100.

NRF 108 can be implemented as a software layer that is separate and shared by other services deployed in a cloud computing environment.

NRF 108 can be configured for tasks such as load balancing. NRF 108 can store real-time information on, for example:

Failed network functions or non-responsive network functions

Load conditions of each network function

Network function response times

Network function connection health

Storing such information at NRF 108 can lead to better network function selection decision making at NRF 108.

NRF 108, or another appropriate network function discovery node, can be configured for performing service discovery between network functions of a telecommunications core network. NRF 108 can periodically receive, from producer network functions, a current load value specifying a computing load carried by the producer network function. NRF 108 can determine, for each producer network function, an available capacity for the producer network function based on the current load value and a published capacity of the producer network function. NRF 108 can respond to a network function discovery request from a consumer network function using the available capacity of each producer network function.

Telecommunications network core 100 can include an SCP, which is a decentralized solution and composed of a control plane and a data plane. The SCP is deployed along side of 5G network functions for providing routing control, resiliency, and observability to the core network. In some examples, the SCP is deployed either as a default outbound proxy to network function instances or as a router model where SCP is configured as an outbound proxy at each network function in cloud native environments. SCP provides the following benefits to the 5G core network architecture:

Improved Load Balancing

Routing Control

Message Priority Assignment/Override

Circuit Breaking and Outlier Detection

Overload Control

Observability

Figure 2:
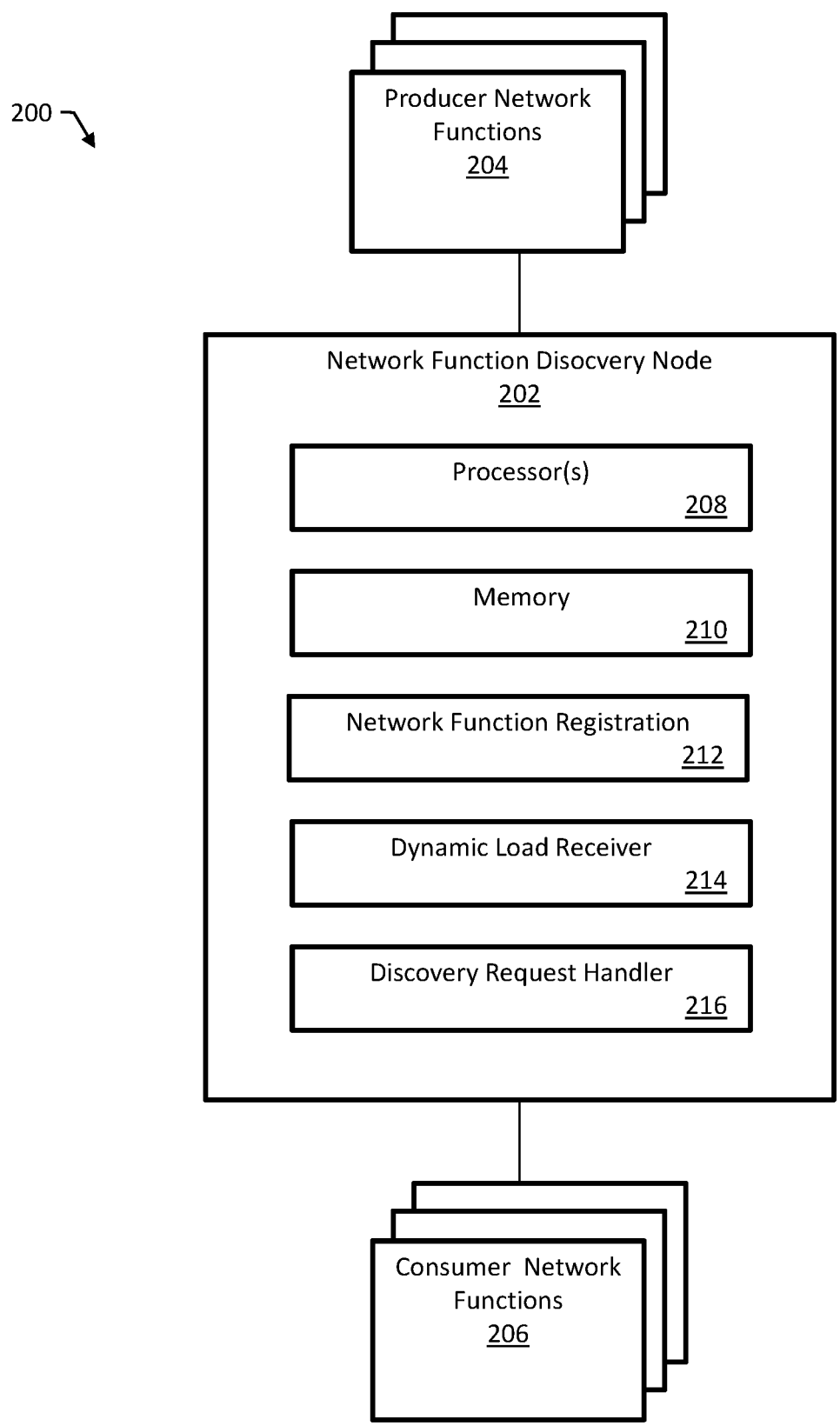
FIG. 2 is a block diagram of an example telecommunications core network.

FIG. 2 is a block diagram of an example telecommunications core network 200 including a network function discovery node 202, producer network functions 204, and consumer network functions 206. Network function discovery node 202 is implemented on at least one processor 208 and memory 210 storing instructions for processor 208. For example, network function discovery node 202 can be implemented on a distributing computing system. Network function discovery node 202 can be implemented, for example, at an NRF or an SCP.

Network function discovery node 202 includes a network function registration engine 212, a dynamic load receiver 214, and a discovery request handler 216. Network function discovery node 202 can execute a rank processing algorithm, for example, at the service level or at the instance level or both.

Network function registration engine 212 is configured for registering producer network functions 204. During registration, network function registration engine 212 can receive a load reporting interval specifying a rate of load reporting for the producer network function. Network function registration engine 212 can, during registration, receive a load reporting interval specifying a rate of load reporting for the producer network function. Registration can also include receiving, e.g., a published capacity, a permissible load threshold, an abatement load threshold, and any other appropriate information.

Dynamic load receiver 214 is configured for periodically receiving, from each producer network function, a current load value specifying a computing load carried by the producer network function. The period for receiving current load values may be a regular period, e.g., after a certain amount of time passes, or an irregular period, e.g., in response to a specified event being detected at the producer network function.

Dynamic load receiver 214 is configured for performing a rank processing algorithm by determining, for each producer network function, an available capacity for the producer network function based on the current load value and a published capacity of the producer network function.

In some examples, dynamic load receiver 214 assigns an available capacity based on the current load of the producer network function as follows:

$$C_A = P_C - (P_L * P_C)$$

where, $C_A$=available capacity of a network function instance;

$P_C$=published capacity of the network function instance; and $P_L$=published load of the network function instance (in %).

In some examples, dynamic load receiver 214 categorizes producer network function instances on the basis of available capacity as follows:

Calculate arithmetic mean of available capacities

Arithmetic mean=Σ $C_A$ of network function instances/number of network function instances Categorize the producer network functions into:

High priority—available capacity greater than arithmetic mean

Low priority—available capacity greater than arithmetic mean

Dynamic load receiver 214 can then sort the list of producer network functions based on the available capacity ($C_A$) and assign priority according to positions in the list.

In some examples, network function discovery node 202 allows the following configurations:

Permissible load threshold: A network function instance is considered heavily loaded when a current load exceeds this threshold.

Abatement load threshold: A threshold for current load that, when the current load falls below the threshold, the network function instance is no longer considered heavily loaded Network function discovery node 202 can be configured to remove any producer network function with a current load above the permissible load threshold from network function discovery responses. Network function discovery node 202 can then reconsider any removed producer network functions when their current load goes below the abatement load threshold.

Discovery request handler 216 is configured for responding to network function discovery requests from consumer network functions using the available capacity of each producer network function. For example, discovery request handler 216 may receive a producer network function discovery request from a consumer network function; determine a list of a producer network functions that are responsive to one or more criteria in the producer network function discovery request; and send a network function discovery response back to the consumer network function with a list of identifiers for the producer network functions. The list may be, for example, sorted by available capacity or priority, or the network function discovery response may include the available capacities and/or priority values for the producer network functions on the list.

In some examples, network function discovery node 202 is configured for determining, for each instance of some network function instances, an instance available capacity, sorting the network function instances by instance available capacity, and assigning a current priority to each instance based on a sorted position of the instance. In some examples, network function discovery node 202 is configured for determining, for each instance of some network function instances, an instance available capacity, determining a mean capacity of the instance available capacities, and categorizing each instance as a high priority instance if the instance available capacity is greater than the mean capacity and as a low priority instance if the instance available capacity is less than or equal to the mean capacity.

In some examples, network function discovery node 202 is configured for determining, for each producer network function, whether the current load for the producer network function exceeds a permissible load threshold and, if the current load exceeds the permissible load threshold, removing the producer network function from consideration in responding to at least one network function discovery request. Network function discovery node 202 can then be configured for reconsidering a removed producer network function in response to determining that the current load for the removed producer network function has dropped below an abatement load threshold.

Figure 3:
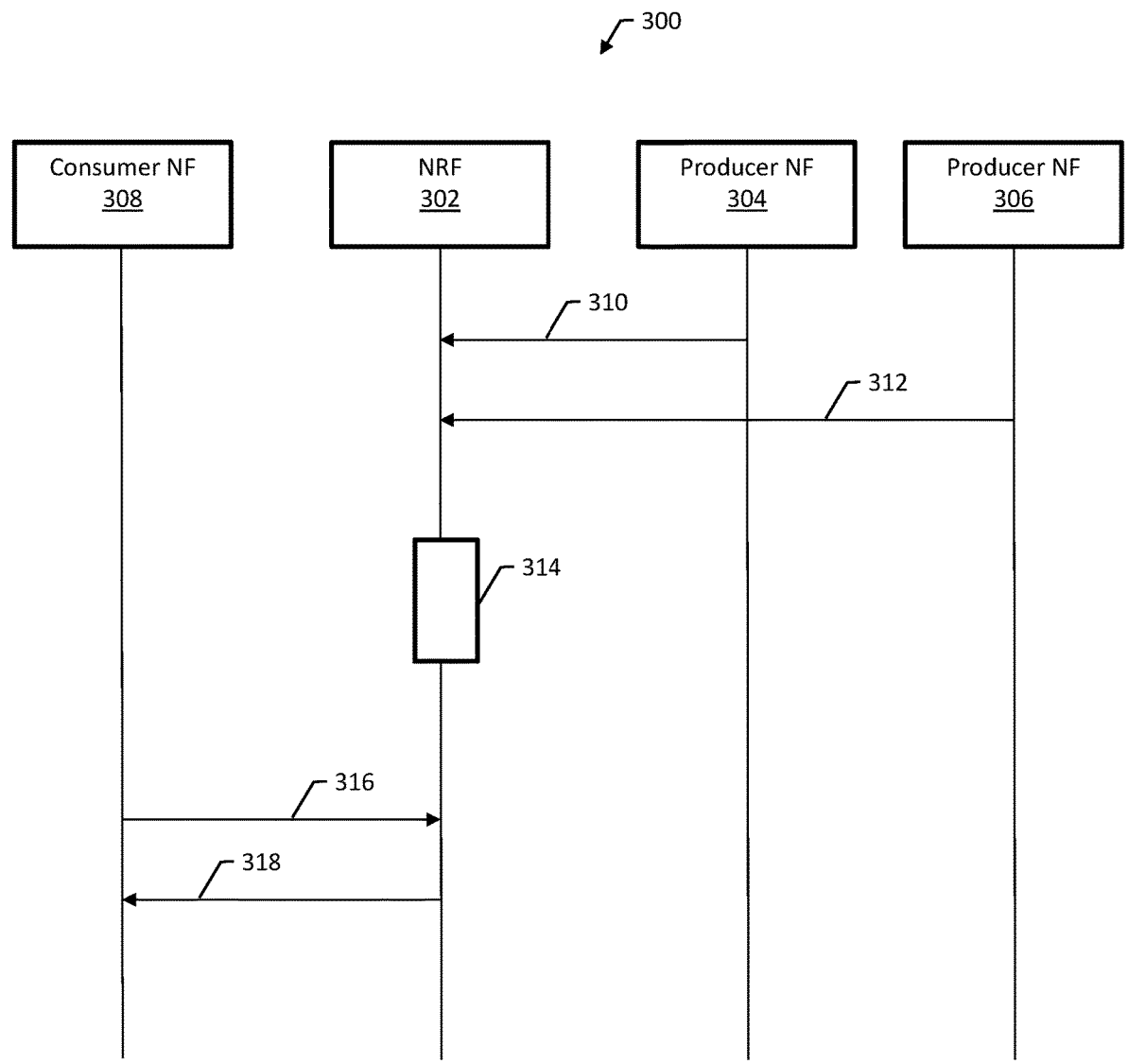
FIG. 3 is a call flow diagram illustrating an example network function discovery procedure.

FIG. 3 is a call flow diagram illustrating an example network function discovery procedure 300. FIG. 3 shows an NRF 302 communicating with two producer network functions 304 and 306 and a consumer network function 308.

Producer network function 304 sends capacity and priority values to NRF 302 during a registration procedure (for example, capacity: 700; priority: 1). Producer network function 306 also sends capacity and priority values to NRF 302 during registration (for example, capacity: 1000; priority: 2).

Producer network function 304 sends a current load value (for example, load: 40%) to NRF 302 in a first message 310. Producer network function 306 sends a current load value (for example, load: 40%) to NRF 302 in a second message 312.

NRF 302 performs the rank processing algorithm 314. For example, continuing with the example numbers given above, NRF 302 calculates the following values:

Producer network function 304—available capacity: 420; calculated priority: 2

Producer network function 306—available capacity: 700; calculated priority: 1

The example shown in FIG. 3 shows NRF 302 performing the rank processing algorithm at the instance level, i.e., between separate instances of a given network function. NRF 302 can also be configured to perform the rank processing algorithm at the service level, i.e., between separate services that may each have separate instances.

NRF 302 receives a network function discovery service request from consumer network function 308 in a third message 316. For example, message 316 can include a query parameter and a locality. NRF 302 determines a response using the priority values determined from performing rank processing algorithm 314.

NRF 302 responds to the network function discovery service request by sending a network function discovery response to consumer network function 308 in a fourth message 318. For example, message 318 can include the following information:

Producer network function 304 identifier—available capacity: 420; calculated priority: 2

Producer network function 306 identifier—available capacity: 700; calculated priority: 1

Consumer network function 308 can then select a producer network function using the dynamically determined available capacities or priority values. In this case, producer network function 304 initially has a higher priority value; however, based on the current load values, producer network function 306 has a higher priority value. Consumer network function 308 can determine to select producer network function 306 since it has more available capacity and a higher priority value.

Producer network function 304 and producer network function 306 can continue to periodically send messages to NRF 302 with current load values. NRF 302 can then continue to perform the rank processing algorithm to determine available capacities and priority values for producer network function 304 and producer network function 306. Consumer network functions that then send network function discovery requests can receive dynamic available capacity and priority values, which can, in turn, allow consumer network functions to choose producer network functions that may provide better service and alleviate overloading of producer network functions.

Figure 4:
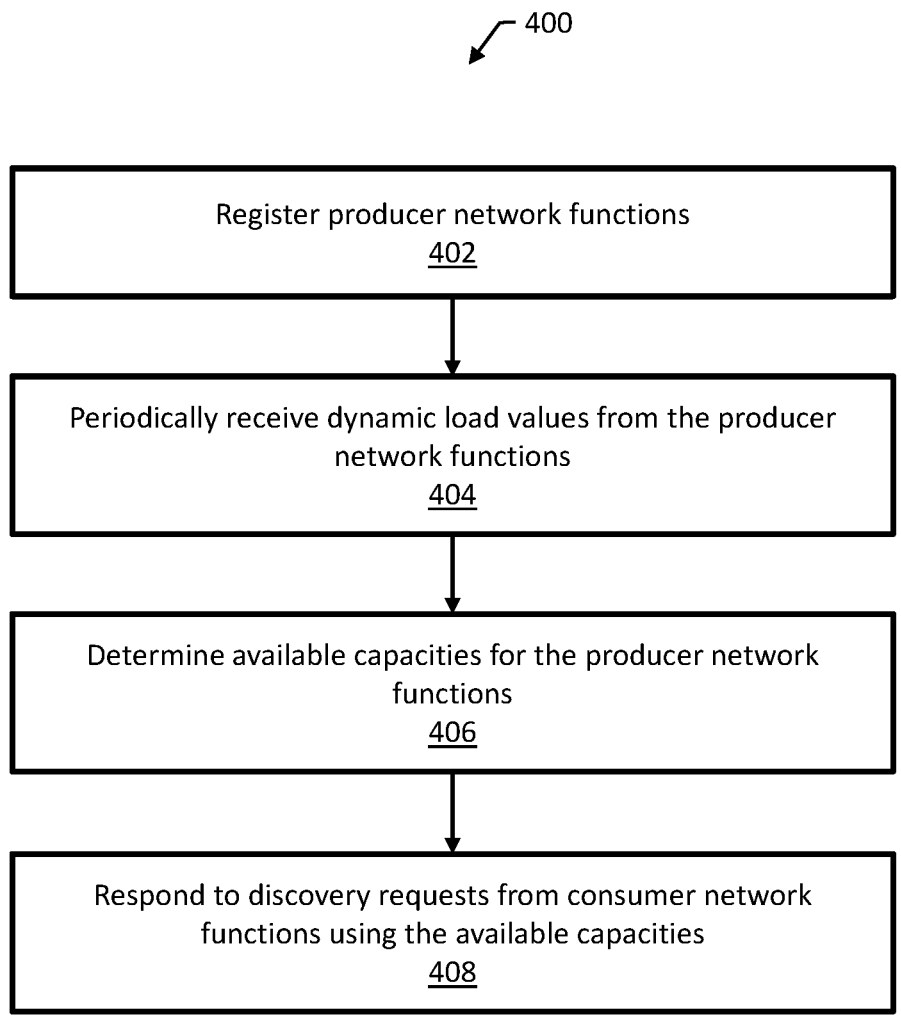
FIG. 4 is a flow diagram of an example method for rank processing in network function selection.

FIG. 4 is a flow diagram of an example method 400 for rank processing in network function selection. Method 400 can be performed a network function discovery node implemented on at least one processor. For example, method 400 can be performed by an NRF or SCP, or any other appropriate network function discovery node. The network function discovery node is configured for performing service discovery between network functions of a telecommunications core network.

Method 400 includes registering producer network functions (402). During registration, method 400 can include receiving a load reporting interval specifying a rate of load reporting for the producer network function. Method 400 can include, during registration, receiving a load reporting interval specifying a rate of load reporting for the producer network function. Registration can also include receiving, e.g., a published capacity, a permissible load threshold, an abatement load threshold, and any other appropriate information.

Method 400 includes periodically receiving, from each producer network function of some producer network functions, a current load value specifying a computing load carried by the producer network function (404).

Method 400 includes determining, for each producer network function, an available capacity for the producer network function based on the current load value and a published capacity of the producer network function (406). In some examples, method 400 includes determining, for each producer network function, a current priority for the producer network function based on the available capacity of the produced network function.

In some examples, method 400 includes determining, for each instance of some network function instances, an instance available capacity, sorting the network function instances by instance available capacity, and assigning a current priority to each instance based on a sorted position of the instance. In some examples, method 400 includes determining, for each instance of some network function instances, an instance available capacity, determining a mean capacity of the instance available capacities, and categorizing each instance as a high priority instance if the instance available capacity is greater than the mean capacity and as a low priority instance if the instance available capacity is less than or equal to the mean capacity.

In some examples, method 400 includes determining, for each producer network function, whether the current load for the producer network function exceeds a permissible load threshold and, if the current load exceeds the permissible load threshold, removing the producer network function from consideration in responding to at least one network function discovery request. Method 400 can then include reconsidering a removed producer network function in response to determining that the current load for the removed producer network function has dropped below an abatement load threshold.

Method 400 includes responding to network function discovery requests from consumer network functions using the available capacity of each producer network function (408).

Method 400 can provide one or more of the following benefits.
- Offload consumer network functions from performing load-based producer network function instance selection
    - Reduce resource utilization at the consumer network function
    - Potential latency reduction in the network
- Improve or optimize load balancing across producer network functions in the telecommunications network core
- Avoid selection of highly loaded producer network functions, which can improve one or more of:
    - Response delay
    - Message success rate
    - Round trip latency
    - KPIs and SLAs
- Flexibility to be applied in different network deployments:
    - PLMN level
    - Slice level
    - Shared-slice level
- The rank processing algorithm can be used at the service communications proxy (SCP) or other appropriate network function discovery nodes.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features.

In particular, with reference to the appended claims, features from dependent claims may be combined with those of the independent claims and features from respective independent claims may be combined in any appropriate manner and not merely in the specific combinations enumerated in the appended claims.

What is claimed is:

1. A system for rank processing in network function selection, the system comprising:
    at least one processor and memory storing instructions for the at least one processor; and
    a network function discovery node implemented on the at least one processor, wherein the network function discovery node is configured for performing service discovery between a plurality of network functions of a telecommunications core network, and wherein the network function discovery node is configured for:
        registering each producer network function of a plurality of producer network functions and, during registration, receiving a load reporting interval specifying a rate of load reporting for the producer network function and receiving a published capacity for the producer network function;
        periodically receiving, from each producer network function, a current load value specifying a computing load carried by the producer network function;
        determining, for each producer network function, an available capacity for the producer network function based on the current load value and the published capacity of the producer network function; and
        responding to a network function discovery request from a consumer network function using the available capacity of each producer network function, wherein responding to the network function discovery request includes sending a network function discovery response identifying at least a first producer network function selected based on the available capacity of the first producer network function.

2. The system of claim 1, wherein the network function discovery node is configured for determining, for each producer network function, a current priority for the producer network function based on the available capacity of the produced network function.

3. The system of claim 1, wherein the network function discovery node is configured for determining, for each instance of a plurality of network function instances, an instance available capacity, sorting the network function instances by instance available capacity, and assigning a current priority to each instance based on a sorted position of the instance.

4. The system of claim 1, wherein the network function discovery node is configured for determining, for each instance of a plurality of network function instances, an instance available capacity, determining a mean capacity of the instance available capacities, and categorizing each instance as a high priority instance if the instance available capacity is greater than the mean capacity and as a low priority instance if the instance available capacity is less than or equal to the mean capacity.

5. The system of claim 1, wherein the network function discovery node is configured for determining, for each producer network function, whether the current load for the producer network function exceeds a permissible load threshold and, if the current load exceeds the permissible load threshold, removing the producer network function from consideration in responding to at least one network function discovery request.

6. The system of claim 5, wherein the network function discovery node is configured for reconsidering a removed producer network function in response to determining that the current load for the removed producer network function has dropped below an abatement load threshold.

7. The system of claim 1, wherein the network function discovery node is configured for registering each of the producer network functions and, during registration, receiving the published capacity of the producer network function and a published priority for the producer network function.

8. The system of claim 1, wherein the network function discovery node is a network function (NF) repository function (NRF) or a service communications proxy (SCP).

9. The system of claim 1, wherein the network function discovery node is configured for determining available capacity of the producer network functions at a service level of the telecommunications network core network.

10. A method for rank processing in network function selection, the method comprising:
registering each producer network function of a plurality of producer network functions and, during registration, receiving a load reporting interval specifying a rate of load reporting for the producer network function and receiving a published capacity for the producer network function;
periodically receiving, at a network function discovery node implemented on at least one processor, and from each producer network function, a current load value specifying a computing load carried by the producer network function, wherein the network function discovery node is configured for performing service discovery between a plurality of network functions of a telecommunications core network;
determining, at the network function discovery node, and for each producer network function, an available capacity for the producer network function based on the current load value and the published capacity of the producer network function; and
responding, at the network function discovery node, to a network function discovery request from a consumer network function using the available capacity of each producer network function, wherein responding to the network function discovery request includes sending a network function discovery response identifying at least a first producer network function selected based on the available capacity of the first producer network function.

11. The method of claim 10, comprising determining, for each producer network function, a current priority for the producer network function based on the available capacity of the produced network function.

12. The method of claim 10, comprising determining, for each instance of a plurality of network function instances, an instance available capacity, sorting the network function instances by instance available capacity, and assigning a current priority to each instance based on a sorted position of the instance.

13. The method of claim 10, comprising determining, for each instance of a plurality of network function instances, an instance available capacity, determining a mean capacity of the instance available capacities, and categorizing each instance as a high priority instance if the instance available capacity is greater than the mean capacity and as a low priority instance if the instance available capacity is less than or equal to the mean capacity.

14. The method of claim 10, comprising determining, for each producer network function, whether the current load for the producer network function exceeds a permissible load threshold and, if the current load exceeds the permissible load threshold, removing the producer network function from consideration in responding to at least one network function discovery request.

15. The method of claim 14, comprising reconsidering a removed producer network function in response to determining that the current load for the removed producer network function has dropped below an abatement load threshold.

16. The method of claim 10, comprising registering each of the producer network functions and, during registration, receiving the published capacity of the producer network function and a published priority for the producer network function.

17. The method of claim 10, wherein the network function discovery node is a network function (NF) repository function (NRF) or a service communications proxy (SCP).

18. A non-transitory computer readable medium having stored thereon executable instructions that when executed by a processor of a computer controls the computer to perform steps comprising:
registering each producer network function of a plurality of producer network functions and, during registration, receiving a load reporting interval specifying a rate of load reporting for the producer network function and receiving a published capacity for the producer network function;
periodically receiving, at a network function discovery node implemented on at least one processor, and from each producer network function, a current load value specifying a computing load carried by the producer network function, wherein the network function discovery node is configured for performing service discovery between a plurality of network functions of a telecommunications core network;
determining, at the network function discovery node, and for each producer network function, an available capacity for the producer network function based on the current load value and the published capacity of the producer network function; and
responding, at the network function discovery node, to a network function discovery request from a consumer network function using the available capacity of each producer network function, wherein responding to the network function discovery request includes sending a network function discovery response identifying at least a first producer network function selected based on the available capacity of the first producer network function.

* * * * *

UNITED STATES PATENT AND TRADEMARK OFFICE
CERTIFICATE OF CORRECTION

PATENT NO. : 11,570,262 B2
APPLICATION NO. : 17/082871
DATED : January 31, 2023
INVENTOR(S) : Sapra et al.

It is certified that error appears in the above-identified patent and that said Letters Patent is hereby corrected as shown below:

On the Title Page

On page 4, Column 2, item (56) under Other Publications, Line 19, delete "14." and insert -- 14). --, therefor.

On page 7, Column 1, item (56) under Other Publications, Line 48, delete "Netwok" and insert -- Network --, therefor.

On page 7, Column 2, item (56) under Other Publications, Line 26, delete "Applicatoin" and insert -- Application --, therefor.

In the Drawings

On sheet 2 of 4, in FIG. 2, under Reference Numeral 202, Line 1, delete "Disocvery" and insert -- Discovery --, therefor.

Signed and Sealed this
Nineteenth Day of December, 2023

*Katherine Kelly Vidal*

Katherine Kelly Vidal
*Director of the United States Patent and Trademark Office*